May 5, 1953 — H. A. THOMAS — 2,637,160
ENGINE MANIFOLD
Filed Sept. 2, 1948 — 3 Sheets-Sheet 1
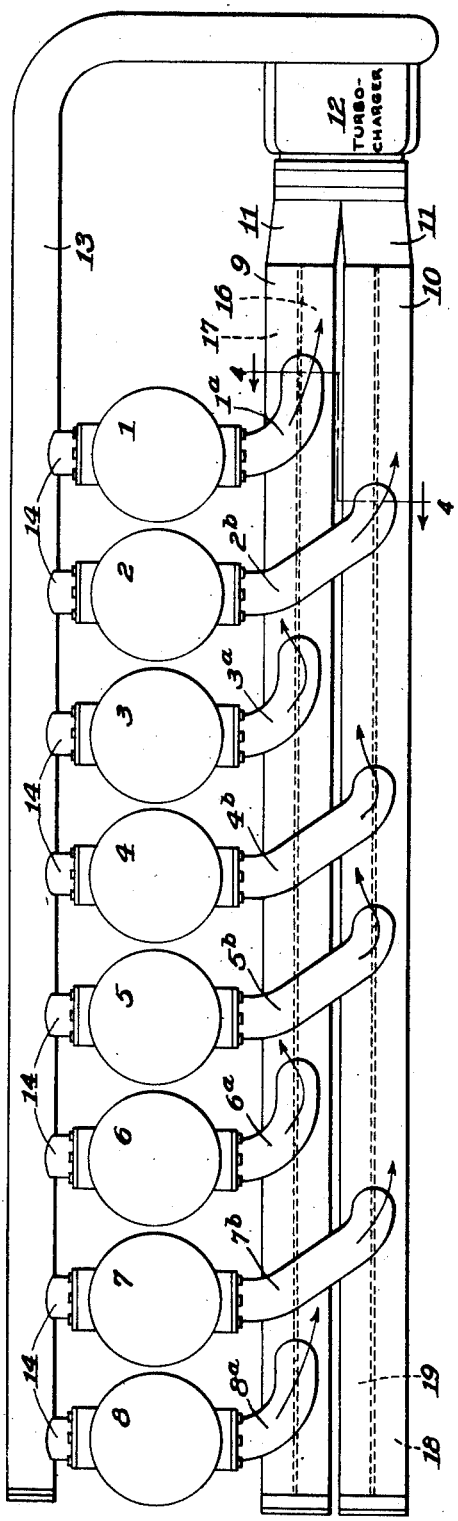
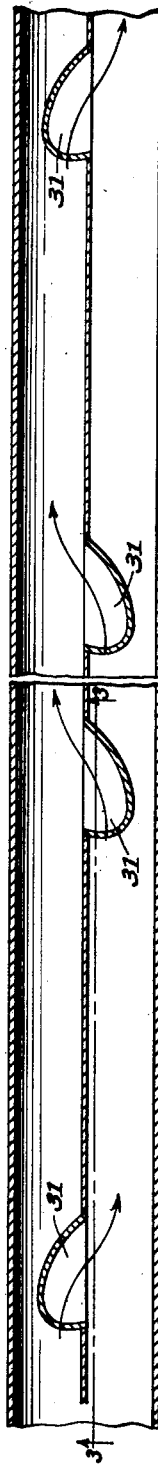
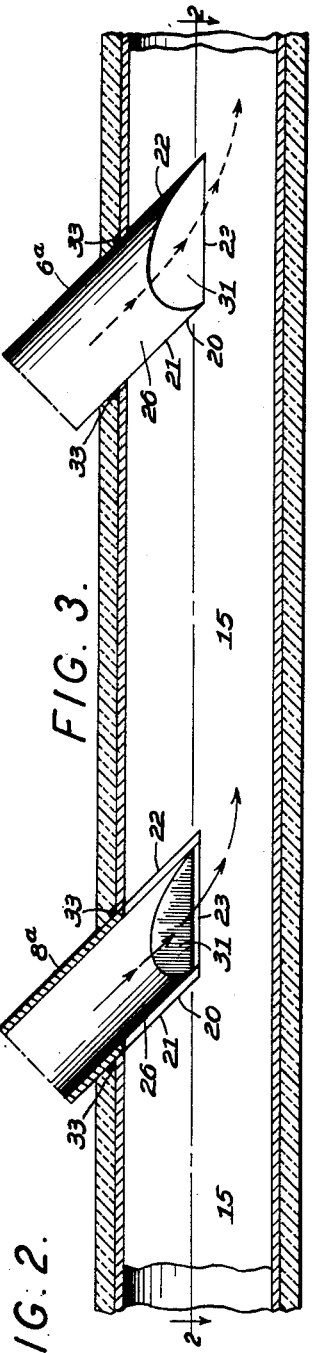
INVENTOR
HARRY A. THOMAS
BY
ATTORNEY May 5, 1953          H. A. THOMAS          2,637,160
ENGINE MANIFOLD
Filed Sept. 2, 1948          3 Sheets-Sheet 2
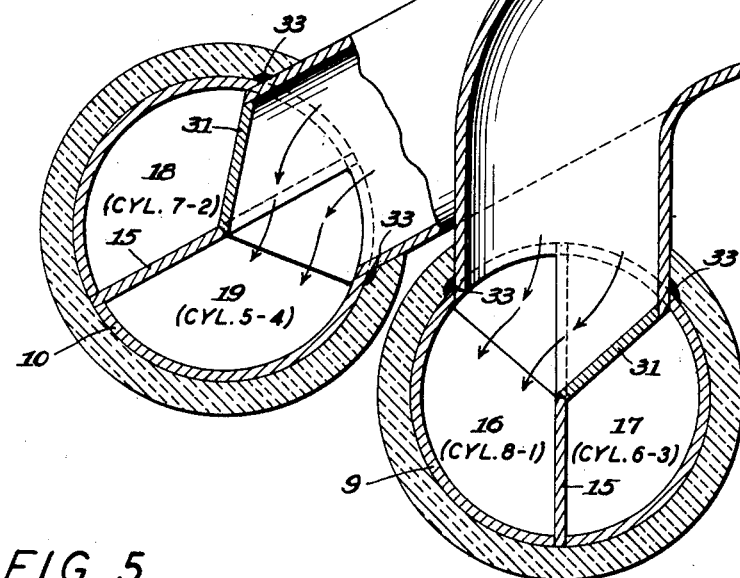
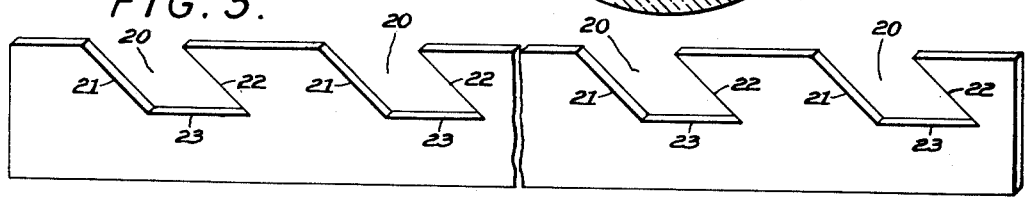
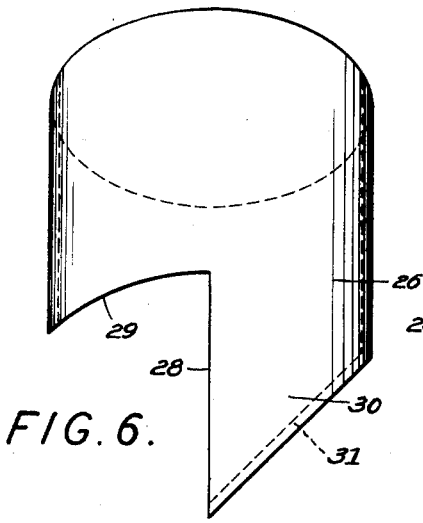
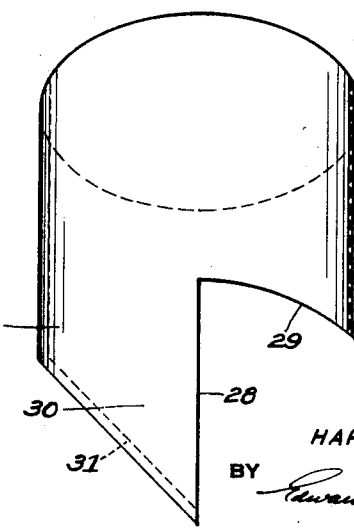
INVENTOR
HARRY A. THOMAS
BY
ATTORNEY May 5, 1953  H. A. THOMAS  2,637,160
ENGINE MANIFOLD
Filed Sept. 2, 1948  3 Sheets-Sheet 3
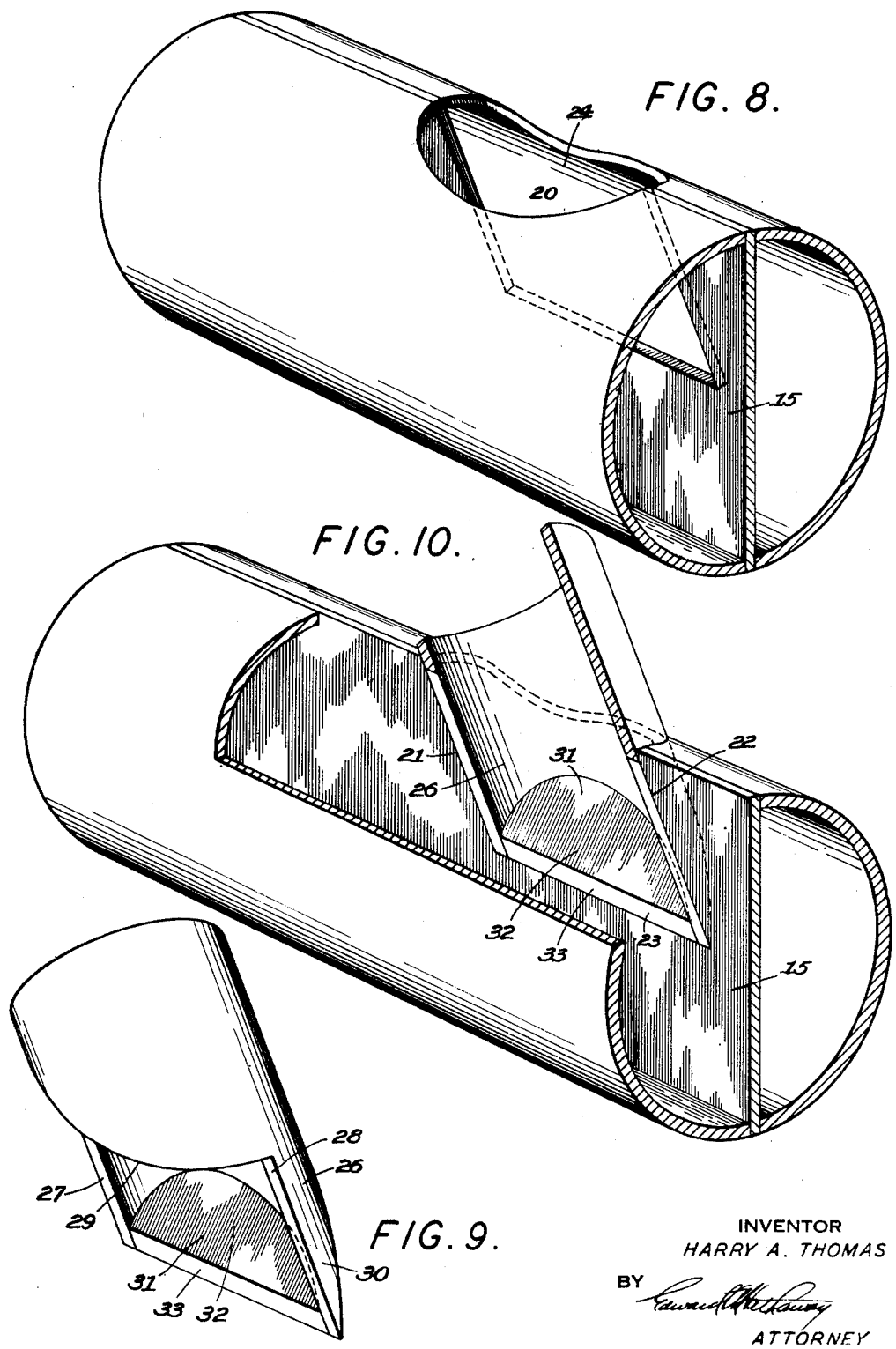
INVENTOR
HARRY A. THOMAS
BY
ATTORNEY Patented May 5, 1953

2,637,160

UNITED STATES PATENT OFFICE 2,637,160

ENGINE MANIFOLD

Harry Andrew Thomas, Baldton, Del., assignor to Baldwin-Lima-Hamilton Corporation, a corporation of Pennsylvania Application September 2, 1948, Serial No. 47,382

5 Claims. (Cl. 60—29)

This invention relates generally to exhaust manifolds for internal combustion engines and particularly for supercharged engines utilizing exhaust pressure waves for operating a turboblower, although the invention is suitable for use with any type of internal combustion engine, either as an air intake manifold or as an exhaust manifold.

Various types of exhaust manifolds have been proposed or used in the general field of my invention but they have been objectionable in that, among other reasons, they occupy a disproportionate amount of space, are cumbersome, require a large amount of piping, increase the amount of heat loss, or are necessarily elaborate in design and complicated in structure, involving considerable expense to manufacture or maintain.

An object of the invention is to provide improved manifold means for use with a supercharged internal combustion engine, that will obviate many of the disadvantages of manifolds heretofore used or proposed. A further object is to provide a manifold that is simple in design and structure, inexpensive to manufacture and maintain, is compact while still keeping heat losses to a minimum, and is so constructed as to permit all parts to be readily accessible for inspection and repair.

Other objects and advantages will be more apparent to those skilled in the art from the following description of the accompanying drawings in which:

Fig. 1 is a diagrammatic plan view of a supercharged engine having eight cylinders in line and provided with my improved manifold arrangement used as an exhaust manifold;

Fig. 2 is a diagrammatic horizontal sectional view of one of the two similar exhaust manifolds shown in Fig. 1, substantially on a line 2—2 of Fig. 3, showing the disposition of the deflecting baffles on either side of the partition plate;

Fig. 3 is a vertical sectional view, taken along the line 3—3 of Fig. 2, of a portion of one of said manifolds and additionally showing insulating lagging around the manifold;

Fig. 4 is a diagrammatic cross sectional view, taken approximately along the line 4—4 of Fig. 1 of the two exhaust manifolds, showing the partition plates, the manifold passages and the arrangement of deflecting baffles with respect thereto;

Fig. 5 is a perspective of a section of a partition plate having diagonal notches;

Figs. 6 and 7 are elevational views of the lower ends of right and left branch exhaust pipes;

Fig. 8 is a perspective view of a portion of an exhaust manifold with the branch exhaust pipe removed;

Fig. 9 is a perspective view of the lower end of a branch exhaust pipe ready to be assembled with Fig. 8; and Fig. 10 is a perspective view of a portion of an exhaust manifold with the branch exhaust pipe of Fig. 9 assembled with the pipe of Fig. 8, the fore part of the manifold being broken away for the sake of clarity.

In the particular embodiment of the invention which is disclosed herein merely for the purpose of illustrating one specific form among possible others that the invention might take in practice I show in Fig. 1 a diagrammatic plan view of a supercharged engine having cylinders 1 to 8 in line. Cylinders 1, 3, 6 and 8 are respectively connected to an exhaust manifold 9 by branch exhaust pipes 1a, 3a, 6a and 8a while cylinders 2, 4, 5 and 7 are respectively connected to a second and similar exhaust manifold 10 by branch exhaust pipes 2b, 4b, 5b and 7b. In conventional manner, all these branch exhaust pipes enter the manifolds at an angle, as indicated in Fig. 3, in the direction of flow of the exhaust gases through the manifolds. Instead of discharging to atmosphere, as in the case of a normally aspirated engine, the gases from exhaust manifolds 9 and 10 are conducted by adapter pipes 11 to a conventional supercharging means, such as, for instance, a turbocharger 12. Turbocharger 12 is connected to an air intake manifold 13 which is in communication with cylinders 1 to 8 through usual branch intake pipes 14. As is well understood in the art, energy in the exhaust gases passing into the turbocharger turbine causes the usual turbocharger blower to be driven.

To provide a simple and effective manifold for preventing the exhaust pressure waves from overlapping, the diametric center of each exhaust manifold 9 and 10, as shown in Figs. 2, 4, 8 and 10, is split by a longitudinal partition plate 15 which divides manifold 9 into longitudinal manifold passages 16 and 17 into manifold 10 into longitudinal manifold passages 18 and 19, Fig. 4. Each of partition plates which may for the sake of convenient assembly be made up of several sections placed end to end, is rigidly secured by welding or any other conventional means to the exhaust manifold in which it is disposed. In the upper portion of these plates are formed notches 20, Fig. 5, having diagonal and parallel edges 21 and 22 and a bottom edge 23 which extends preferably to and along the longitudinal center line of the plate.

In the wall of each manifold immediately above these notches are openings 24, Fig. 8, of elliptical formation, into which are inserted the lower ends, generally indicated at 26, Figs. 3, 6, 7, 9 and 10, of the angularly disposed branch exhaust pipes. All these lower ends 26 are similarly formed except that half thereof are of right formation and the other half of left formation, as shown in Figs. 6 and 7. Such right and left formations are necessary so that the exhaust gases from one cylinder may be directed into one of the passages of a manifold while the gases from another cylinder may be directed into the other passage of said manifold, as is hereinafter more particularly described. A longitudinal half of each lower end 26 of these branch exhaust pipes is cut away to leave straight edges 27 and 28 and a curved edge 29, Figs. 6, 7 and 9. Curved edge 29 is shaped to conform to the curve of the manifold wall so that when lower end 26 is inserted in a manifold passage, curved edge 29 will be flush with the inner wall of the manifold. The extreme end of the remaining longitudinal half 30 of each branch exhaust pipe is provided with a partial bottom closure 31 in the nature of a deflecting baffle plate of approximately semi-elliptical shape, which is inserted within said end and secured thereto by any conventional means such as welding. This construction provides a lateral opening 32, Fig. 9, whose sides are straight edges 27 and 28, curved edge 29 and straight edge 33 of deflecting baffle plate 31. With lower end 26 of each exhaust pipe, whether of right or left formation, inserted in a manifold opening 24, straight edges 27 and 28 fit between diagonal edges 21 and 22 of partition plate notch 20 and straight edge 33 of baffle plate 31 against bottom edge 23 of notch 20. The baffle plates are of course placed at such angle to the direction of gas flow as may prove most effective in deflecting the gases into the manifold passages through lateral openings 32. An elliptical weldment 33 in the seam formed by the juncture of the outer walls of the branch exhaust pipes and the manifold, as shown in Figs. 3 and 4, holds lower end 26 rigidly in position. Owing to such rigidity of lower end 26 and of partition plate 15, there is no need to secure to each other the pairs of engaging edges mentioned above. Any leakage of exhaust gases between inexactly fitting edges into the adjoining manifold passage would be negligible in amount and pressure and weldment 33 would prevent any such leakage from escaping to atmosphere. It is to be pointed out that this arrangement of right and left lower ends 26 of the branch exhaust pipes enables the pipes of each exhaust manifold to be in alignment and at the same time allows the exhaust gases to be deflected into the proper manifold passages.

*Operation.*—Assuming that the firing order of the cylinders is 1—4—7—6—8—5—2—3, the slug of exhaust gas from cylinder 1, Figs. 1, 2 and 4 travels through branch exhaust pipe 1a of right formation, strikes deflecting baffle plate 31, passes through lateral opening 32 and diagonal notch 20 in partition plate 15 and thence into manifold passage 16, to travel to turbocharger 12. Cylinder 4 next discharges its slug of exhaust gas into branch exhaust pipe 4b of left formation. After being deflected by a similar but reversed deflecting baffle plate 31, the slug enters manifold passage 19, through lateral opening 32 and thence travels to the turbocharger. The slug from cylinder 7 likewise passes through branch exhaust pipe 7b of right formation into manifold passage 18, and the slug from cylinder 6 through pipe 6a of left formation into manifold passage 17. All four of the cylinders mentioned above have, to this point, discharged their slugs of exhaust gas into separate manifold passages and there has in consequence been no conflict therebetween. When cylinder 8 discharges, however, the slug therefrom goes into the same manifold passage as did the slug from cylinder 1, that is, manifold passage 16, but there is no conflict of the second slug with the first slug owing to the fact that the first slug has long since passed out of the manifold passage and entered the turbocharger. The slug from cylinder 5 likewise enters the same manifold passage through which the slug from cylinder 4 has passed, that is, manifold passage 19, but the slug from cylinder 4 has long since left the passage and entered the turbocharger. So with the slug from cylinder 2 which enters the same manifold passage through which the slug from cylinder 7 has passed, and the same with the slug from cylinder 3 which enters the same manifold through which the slug from cylinder 6 has passed. It is to be seen that the slugs of gases in any one passage substantially will not overlap. It is further seen that the construction I employ of fitting the branch exhaust pipes in the notches of the partition plates permits the ready removal of any such pipe from the manifold for repair or replacement merely by de-seaming weldment 33 and lifting the branch exhaust pipe out of the manifold. It is to be understood that additional exhaust manifolds of the type described may be added to the two shown here for engines having a greater number of cylinders than eight; also that in the case of engines having an odd number of cylinders one of the manifold passages may be left unconnected without impairing the effectiveness of the remaining passage.

It is seen from the disclosure herein that I have provided a simple, efficient and economical manifold arrangement for internal combustion engines of the type requiring no conflict of slugs of exhaust gas from various cylinders, and my improved manifold further permits any part thereof to be readily removed for replacement or repair without disturbing other parts.

It will, of course, be understood by those skilled in the art that various changes may be made in the construction and arrangement of parts without departing from the spirit of the invention as set forth in the appended claims.

I claim:

1. A manifold for an internal combustion engine having a plurality of cylinders comprising, in combination, a pipe having a longitudinal partition to form a pair of longitudinal passages therein, said pipe having spaced openings in its side and each of said openings extending over each side of said partition so as to be intersected by the partition if extended, notches formed in said partition in communicating alignment with and adjacent to each of said openings, and branch pipes for connection to the engine cylinders extending through said openings, one of said branch pipes having a partial bottom closure disposed on one side of said partition to prevent communication of such branch pipe with the longitudinal passage on that side but at the same time cause gases to flow from the branch pipe through its adjacent partition notch into the other longitudinal passage, and another of said branch pipes having a similar partial bottom closure disposed on the other side of said partition to direct gases into the opposite longitudinal passage.

2. The combination set forth in claim 1 further characterized in that said branch pipes and their bottom closures are of left and right hand formation disposed in the pipe openings and partition notches so that those of left hand formation communicate with one longitudinal passage while those of right hand formation communicate with the other longitudinal passage, said openings lying in a common line along the length of the pipe.

3. The combination set forth in claim 2 further characterized in that the partial bottom closures of the branch pipes are inclined to form a deflecting baffle.

4. The combination set forth in claim 3 further characterized in that the partition notches are inclined in the direction of flow through the longitudinal passages.

5. The combination set forth in claim 1 further characterized in that the manifold piping comprises two halves with the partition separating the same.

HARRY ANDREW THOMAS.

References Cited in the file of this patent

UNITED STATES PATENTS

| Number | Name | Date |
|---|---|---|
| 1,205,095 | Kelly | Nov. 14, 1916 |
| 2,423,574 | Barrett | July 8, 1947 |
| 2,455,493 | Jacobs | Dec. 7, 1948 |